(12) United States Patent
Goodart et al.

(10) Patent No.: US 8,898,366 B2
(45) Date of Patent: *Nov. 25, 2014

(54) SYSTEM AND METHOD FOR PROVIDING PCIE OVER DISPLAYPORT

(71) Applicants: Joseph Edgar Goodart, Austin, TX (US); Shuguang Wu, Round Rock, TX (US)

(72) Inventors: Joseph Edgar Goodart, Austin, TX (US); Shuguang Wu, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/682,393

(22) Filed: Nov. 20, 2012

(65) Prior Publication Data

US 2013/0103876 A1    Apr. 25, 2013

Related U.S. Application Data

(63) Continuation of application No. 13/233,277, filed on Sep. 15, 2011, now Pat. No. 8,341,325, which is a continuation of application No. 11/622,715, filed on Jan. 12, 2007, now Pat. No. 8,051,217.

(51) Int. Cl.
G06F 13/20  (2006.01)
G06F 13/40  (2006.01)
G06F 13/00  (2006.01)

(52) U.S. Cl.
CPC ............ *G06F 13/4022* (2013.01); *G06F 13/40* (2013.01)
USPC ............................................ 710/313; 710/33

(58) Field of Classification Search
USPC ........................................................ 710/313
See application file for complete search history.

(56) References Cited

U.S. PATENT DOCUMENTS

| | | | |
|---|---|---|---|
| 6,401,140 B1 | 6/2002 | Wu | |
| 6,513,114 B1 | 1/2003 | Wu et al. | |
| 6,598,193 B1 | 7/2003 | Li et al. | |
| 6,618,773 B1 | 9/2003 | Chang et al. | |
| 6,732,267 B1 | 5/2004 | Wu et al. | |
| 7,082,529 B2 | 7/2006 | Cantwell et al. | |
| 7,174,411 B1 | 2/2007 | Ngai | |
| 7,620,062 B2 * | 11/2009 | Kobayashi | 370/433 |
| 2004/0215953 A1 | 10/2004 | Cantwell et al. | |
| 2005/0273312 A1 * | 12/2005 | Sandulescu et al. | 703/25 |
| 2006/0190633 A1 | 8/2006 | Cantwell et al. | |
| 2007/0121495 A1 | 5/2007 | Breti et al. | |

* cited by examiner

*Primary Examiner* — Henry Tsai
*Assistant Examiner* — Dean Phan
(74) *Attorney, Agent, or Firm* — Terrile, Cannatti, Chambers & Holland, LLP; Robert W. Holland

(57) ABSTRACT

An apparatus and method is disclosed for providing an extensible information handling system (IHS) bus implemented on predetermined channels of a digital video interface. IHS video signal information is multiplexed with IHS bus information by a host multiplexer for transmission across a digital video connector. The multiplexed IHS video signal and IHS bus information is received by a display multiplexer, where it is demultiplexed. Demultiplexed IHS video signal information is received by a video interface receiver, where it is used to generate an image on a digital display. Demultiplexed IHS bus information is received by a host bus interface transmitter/receiver, where it is used to support peripheral devices attached to the digital display.

12 Claims, 4 Drawing Sheets

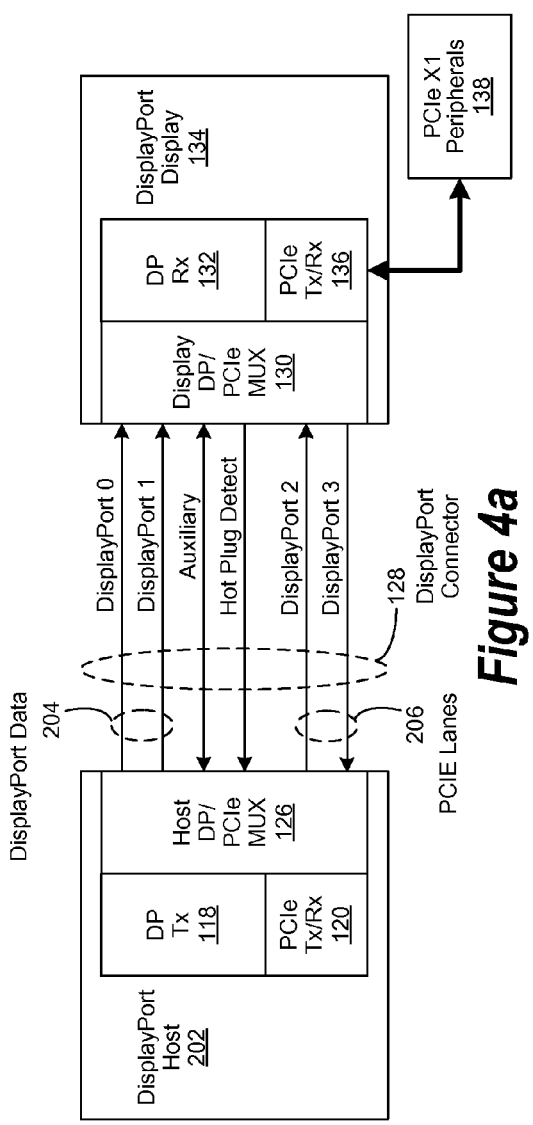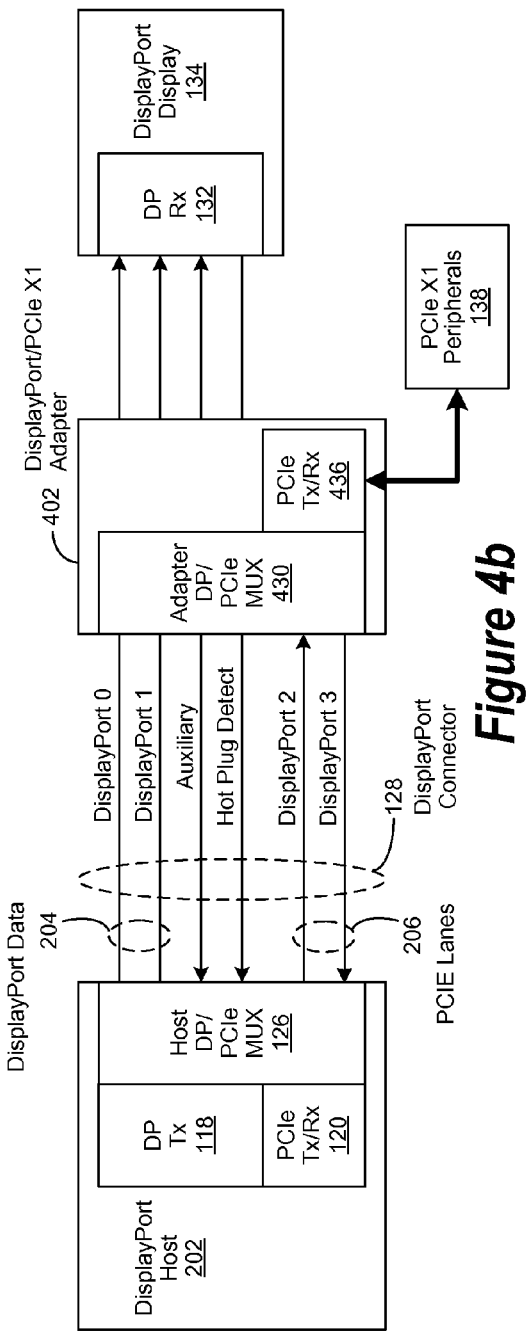

SYSTEM AND METHOD FOR PROVIDING PCIE OVER DISPLAYPORT

This application is a continuation of co-pending application Ser. No. 13/233,277, filed Sep. 15, 2011, which is a continuation of application Ser. No. 11/622,715, filed Jan. 12, 2007, now U.S. Pat. No. 8,051,217. Both of these applications are incorporated herein by reference in their entirety.

BACKGROUND OF THE INVENTION

1. Field of the Invention

Embodiments of the invention relate generally to information handling systems. More specifically, embodiments of the invention provide an improved method and apparatus for transporting data between an information handling system and peripheral devices.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Digital displays have become increasingly popular and include flat panel screens and projectors that are used not just with information handling systems, but also with video display systems in both consumer and corporate environments. While many of these displays can accept analog signal input, their optimum resolution is best realized through a digital interface capable of mapping a video image to the native resolution of the panel. As a result, there has been a steady migration away from video graphics array (VGA) and component RGB video analog input to digital interfaces such as digital video interface (DVI). Unlike analog interfaces which are affected by electrical noise and other sources of distortion, DVI's digital protocol uses binary data to control the desired brightness of each pixel in the display. A single DVI link consists of four twisted pairs of wire (red, green, blue, and clock) to transmit 24 bits per pixel, which closely matches that of an analog video signal. However, maximum resolution for a single DVI link at 60 Hz is limited to 2.6 megapixels. A second DVI link can be enabled if greater bandwidth (e.g., for high definition television) is required, but DVI is limited to no more than two links. Another limitation is DVI's lack of inherent support of digital content copy protection. High-Bandwidth Digital Content Protection (HDCP), a form of digital rights management (DRM) developed by Intel Corporation, can be implemented on DVI, but HDCP is supported on a limited number of digital displays, which limits its effectiveness.

High-Definition Multimedia Interface (HDMI) is another digital interface that is currently gaining popularity. HDMI provides a maximum bandwidth of 340 megapixels/second, which is capable of supporting the highest resolution computer monitors currently available. When coupled to an HDMI display, HDCP is automatically supported to provide digital content protection capabilities. Furthermore, HDMI is backwards-compatible with single-link DVI implementations when an adapter cable is used. However, computer, audio/video, and digital display manufacturers share a number of concerns regarding DVI and HDMI. First, they are concerned about future computer display bandwidth requirements, which DVI and HDMI fail to address. Second, they recognize the need to support more comprehensive encryption standards for improved digital content protection. Third, they are aware that several video standards are being implemented in parallel, which confuses consumers and complicates installations. Ideally, they would prefer a single, universal digital interface standard that uses a common, multi-purpose cable regardless of whether it is implemented for computers, audio/video equipment, or both.

These technology and market drivers have led to the development of the DisplayPort video interface by the Video Electronics Standards Association (VESA). DisplayPort is based on the physical (PHY) layer of the 2.5-Gbit/s PCI Express (PCIe) bus to provide bandwidth of up to 10.8 Gbits/s over four channels, commonly referred to as "lanes." It also delivers an improved copy protection scheme that uses a 128-bit encryption key in concert with the advanced encryption standard (AES) as opposed to the 40-bit key used in HDCP. Furthermore, it adds support for checking the proximity of the transmitting device (e.g., computer system) and video receiver (e.g., flat panel display) to further prevent the unauthorized distribution of digital content. Concurrently, a cable specification is in progress that would allow the PCIe bus to be extended. This extension would allow the external attachment of high-performance peripherals to computer systems, many of which are used in multi-media entertainment systems. However, implementation of these peripherals would require attaching a PCIe cable to the host system, which may not be easily accessible, and would add an additional cable for the user to manage. Ideally, the PCIe bus would be extended to the DisplayPort device to facilitate the attachment of a PCIe peripheral, but no such capability currently exists.

SUMMARY OF THE INVENTION

An apparatus and method is disclosed for providing an extensible information handling system (IHS) bus implemented on predetermined channels of a digital video interface. In selected embodiments, IHS video signal information is multiplexed with IHS bus information by a host multiplexer for transmission across a digital video connector. The multiplexed IHS video signal and IHS bus information is received by a display multiplexer, where it is demultiplexed. Demultiplexed IHS video signal information is received by a video interface receiver, where it is used to generate an image on a digital display. Demultiplexed IHS bus information is received by a host bus interface transmitter/receiver, where it is used to support peripheral devices attached to the digital display. In various embodiments of the invention, data is transferred using a DisplayPort connector comprising four communication channels, or "lanes." Lanes '0' and '1' are assigned to carry DisplayPort video information, and lanes '2' and '3' are assigned to carry multiplexed IHS bus information. In embodiments of the invention, the IHS bus is implemented as a peripheral component interconnect express (PCIe) bus.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2a-c are simplified block diagrams illustrating an implementation of a PCIe X1 bus extension in accordance with an embodiment of the invention;

FIGS. 4a-b are simplified block diagrams illustrating alternative implementations of a PCIe X1 bus extension delivered through a DisplayPort connector in accordance with the present invention.

DETAILED DESCRIPTION

The apparatus and method of the invention provides an extensible information handling system (IHS) bus implemented on predetermined channels of a digital video interface. IHS video signal information is multiplexed with IHS bus information by a host multiplexer for transmission across a digital video connector. The multiplexed IHS video signal and IHS bus information is received by a display multiplexer, where it is demultiplexed. Demultiplexed IHS video signal information is received by a video interface receiver, where it is used to generate an image on a digital display. Demultiplexed IHS bus information is received by a host bus interface transmitter/receiver, where it is used to support peripheral devices attached to the digital display.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
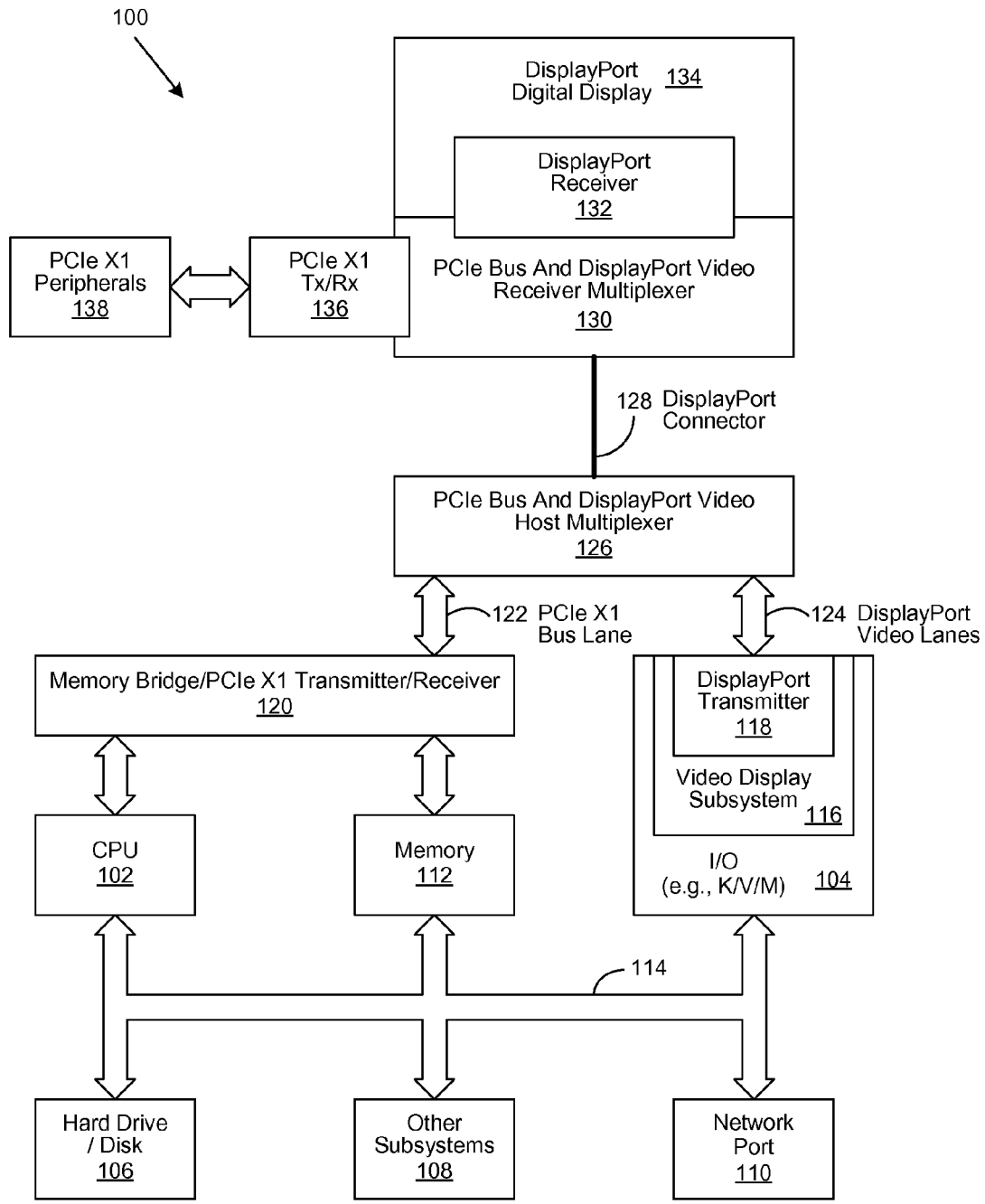
FIG. 1 is a general illustration of components of an information handling system containing video displays implementing the method and apparatus of the present invention.

Referring to FIG. 1, the information handling system 100 includes a processor 102 and various other subsystems 108 understood by those skilled in the art. Data is transferred between the various system components via various data buses illustrated generally by bus 114. In selected embodiments of the invention, bus 114 comprises a PCIe bus. Unlike its PCI bus predecessor, the PCIe bus is a two point serial link, removing PCI's requirement of devices sharing bandwidth. PCIe transfers data at 250 MB/s per channel, or "lane," to a maximum of 32 lanes for a total combined transfer rate of 8 GB/s. The PCIe bus is also a full-duplex, allowing it to transfer data in both directions at once, effectively doubling the data transfer rate to 500 MB/s per lane resulting in a combined transfer rate of 16 GB/s when all 32 lanes are employed.

PCI Express is a layered protocol, consisting of a Transaction Layer, a Data Link Layer, and a Physical Layer. The PCIe physical (PHY) layer consists of a network of serial interconnects similar to Ethernet, thereby allowing switching and parallelism. The Physical Layer is further divided into a logical sublayer and an electrical sublayer. The logical sublayer is frequently further divided into a Physical Coding Sublayer (PCS) and a Media Access Control (MAC) sublayer, which correlate to their respective terms in the IEEE 802 model of networking protocol. A connection between any two PCIe devices is known as a "link," and is built up from a collection of 1 or more dedicated, unidirectional couples of serial (1-bit), point-to-point connections known as a "lanes." All PCIe-compliant devices minimally support a single-lane (i.e., X1) link. PCIe devices may optionally support higher bandwidth links composed of 2, 4, 8, 12, 16, or 32 lanes.

Information handling system 100 further comprises a hard drive or other mass storage device 106, system memory 112, input/output (I/O) interface 104 operable to provide support for keyboard, mouse and video, and network port 110. In selected embodiments of the invention, I/O interface 104 comprises video display subsystem 116, which further comprises DisplayPort transmitter 118. DisplayPort transmitter 118 also comprises an electrical interface that is similar to the PCIe physical layer as described in greater detail herein. Memory bridge/PCIe X1 transmitter/receiver (Tx/Rx) 120 is coupled to CPU 102 and memory 104 to support the extension of a single PCIe (i.e., PCIe XI) bus lane 122. PCIe X1 bus lane 122 is multiplexed with up to two DisplayPort video lanes 124 by PCIe bus and DisplayPort video host multiplexer 126. The DisplayPort connector 128 couples DisplayPort video host multiplexor 126 to DisplayPort video receiver multiplexer 130.

The DisplayPort connector 128 comprises four DisplayPort lanes, two of which are implemented in various embodiments of the invention to extend the PCIe X1 bus lane 122 to DisplayPort digital display 134. In these embodiments, DisplayPort lanes '0' and '1' are assigned to carry video signal information and lanes '2' and '3' are assigned to carry PCIe X1 bus information. The PCIe bus and DisplayPort video receiver multiplexer 130 receives PCIe bus information and DisplayPort video signal information conveyed by DisplayPort Connector 128 and demultiplexes the received information. DisplayPort video signal information is demultiplexed from DisplayPort lanes '0' and '1' and routed to DisplayPort receiver 132, which uses the demultiplexed video signal information to generate a visible image on DisplayPort digital display 134. PCIe X1 bus information is similarly demultiplexed from DisplayPort lanes '2' and '3' and routed to PCIe X1 bus transmitter/receiver 136, which uses the demultiplexed PCIe X1 bus information to support PCIe X1 peripherals 138.

Figure 2C:
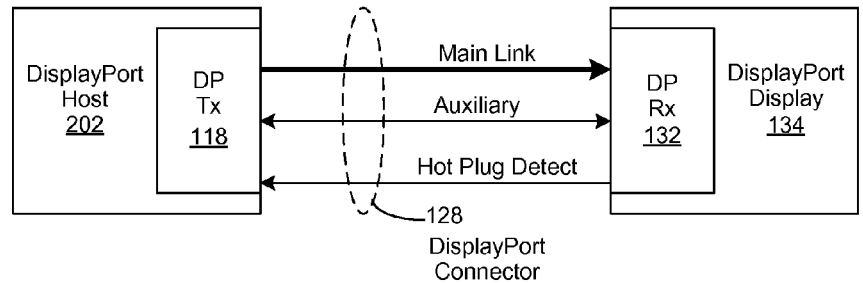
Figure 2C:
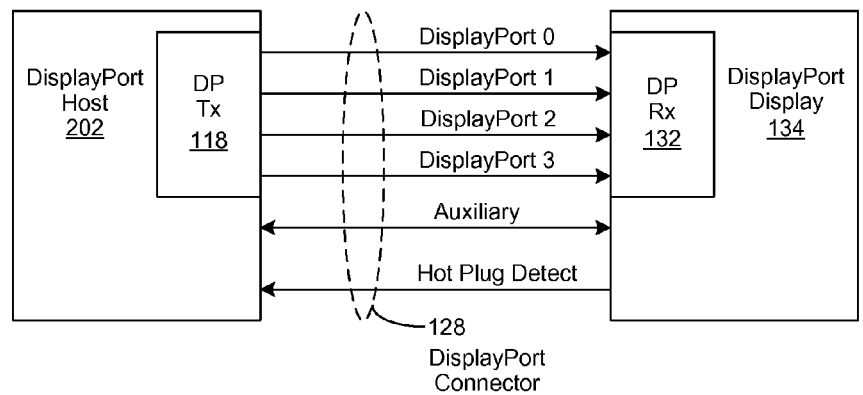
Figure 2C:
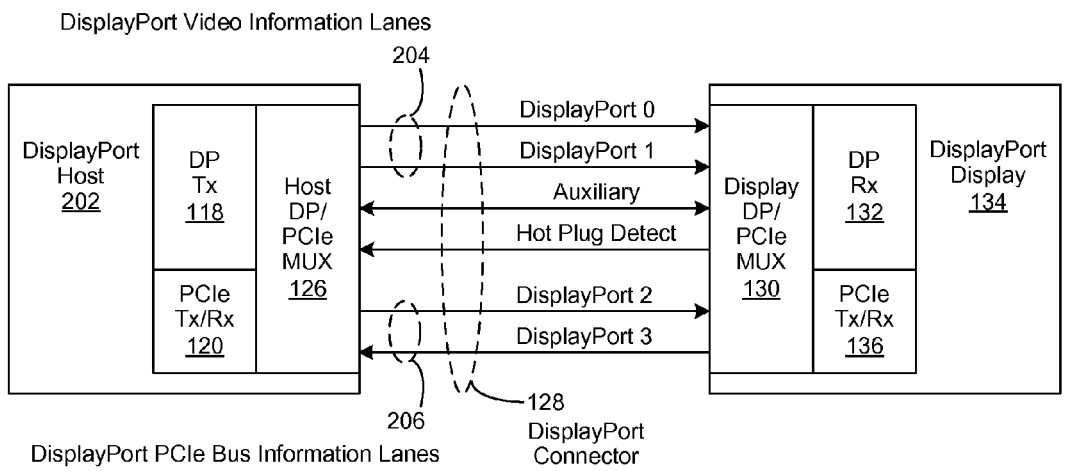

FIGS. 2a-c are simplified block diagrams illustrating an implementation of a PCIe X1 bus extension in accordance with an embodiment of the invention. FIG. 2a is a prior art illustration of a DisplayPort host 202 coupled via DisplayPort connector 128 to DisplayPort digital display 134. Display- Port host 202 comprises DisplayPort transmitter 118, which communicates video display information to DisplayPort receiver 132 via DisplayPort connector 128. DisplayPort connector 128 comprises a unidirectional main link, a bi-directional auxiliary link, and a unidirectional hot plug detect link. The main link comprises a uni-directional, high-bandwidth, low-latency channel used for transport of isochronous streams such as uncompressed video and audio. The auxiliary channel comprises a half-duplex bidirectional channel used for link management and device control. The hot plug detect (HPD) signal serves as an interrupt request by the DisplayPort digital display 134.

FIG. 2b is an expanded prior art illustration of the DisplayPort elements described in FIG. 2a. In this illustration, the main link comprising the DisplayPort connector 128 further comprises AC-coupled, doubly terminated communication channels, or "lanes." AC-coupling facilitates communication between DisplayPort transmitter 118 and DisplayPort receiver 132, as they may have different common mode voltages. Link rates of 2.7 Gbps and 1.62 Gbps are supported for each lane. Link rates are determined by the capabilities of the DisplayPort transmitter 118 and receiver 132, and the quality of the DisplayPort connector 128 that is implemented.

The main link comprises DisplayPort '0,' '1,' '2,' and '3,' all of which carry data. DisplayPort host 202 and DisplayPort receiver 134 are operable to support the minimum number of lanes required for their needs. DisplayPort devices (e.g., display 134) that support two lanes are required to support both one and two lanes, while those devices support four lanes are required to support one, two, and four lanes. DisplayPort connector 128 is required to support four lanes for maximizing the interoperability between the DisplayPort host 202 and the DisplayPort receiver 134. The auxiliary (AUX) channel comprises an AC-coupled, doubly terminated channel that is half-duplex and bi-directional. The AUX channel is used for link management between the DisplayPort host 202 and the DisplayPort receiver 134. Upon a hot plug detect (HPD) event, DisplayPort host 202 configures the link through link training. Handshakes commence between DisplayPort transmitter 118 and receiver 132 through the AUX channel to enable the appropriate number of lanes required to support the desired link rate at required drive current and equalization levels. During operation following link training, DisplayPort receiver 132 may generate a notification of link status change, such as loss of synchronization, by toggling an HPD signal, thus sending an interrupt request. DisplayPort transmitter 118 then checks the link status via the AUX channel and takes corrective action.

FIG. 2c is a generalized block diagram illustration of a DisplayPort host 202 coupled via DisplayPort connector 128 to DisplayPort digital display 134 as implemented in an embodiment of the invention. DisplayPort host 202 comprises DisplayPort transmitter 118, which communicates video display information to DisplayPort receiver 132 via DisplayPort connector 128. DisplayPort connector 128 comprises a unidirectional main link, a bi-directional auxiliary link, and a unidirectional hot plug detect link. The main link is a uni-directional, high-bandwidth, low-latency channel used for transport of isochronous streams such as uncompressed video and audio. The auxiliary channel is a half-duplex bidirectional channel used for link management and device control. The hot plug detect (HPD) signal serves as an interrupt request by the DisplayPort digital display 134.

DisplayPort host 202 comprises DisplayPort transmitter 118, used to communicate DisplayPort video signal information, and PCIe bus transmitter/receiver (Tx/Rx) 120 used to communicate PCIe bus information. DisplayPort host 202 further comprises host DisplayPort/PCIe multiplexer 126, which multiplexes DisplayPort video signal information for transport over DisplayPort video signal information lanes '0' and '1' 204 comprising DisplayPort connector 128. DisplayPort/PCIe multiplexer 126 similarly multiplexes PCIe X1 bus information for transport over DisplayPort PCIe bus information lanes '0' and '1' 206, which likewise comprise DisplayPort connector 128.

Multiplexed DisplayPort video signal information and PCIe bus information are received by display DisplayPort/PCIe multiplexer 130 where it is demultiplexed. Demultiplexed DisplayPort video signal information conveyed over DisplayPort video signal information lanes '0' and '2' is routed by the DisplayPort/PCIe multiplexer 130 to the DisplayPort receiver 132. The DisplayPort receiver 132 then uses the demultiplexed DisplayPort video signal information to generate a visible image on DisplayPort digital display 134. Demultiplexed PCIe bus information similarly conveyed over DisplayPort PCIe bus information lanes '2' and '3' 206 is routed by the DisplayPort/PCIe multiplexer 130 to the PCIe Tx/Rx 136. The PCIe Tx/Rx 136 then uses the demultiplexed PCIe bus information to support PCIe peripherals (not shown). Although various embodiments of the invention are illustrated using multiplexers to facilitate the transfer of data between the host, the display and the peripheral device, those of skill of the art will recognize that embodiments of the invention can also be implemented by providing hardwire connections between the various system components.

Figure 3:
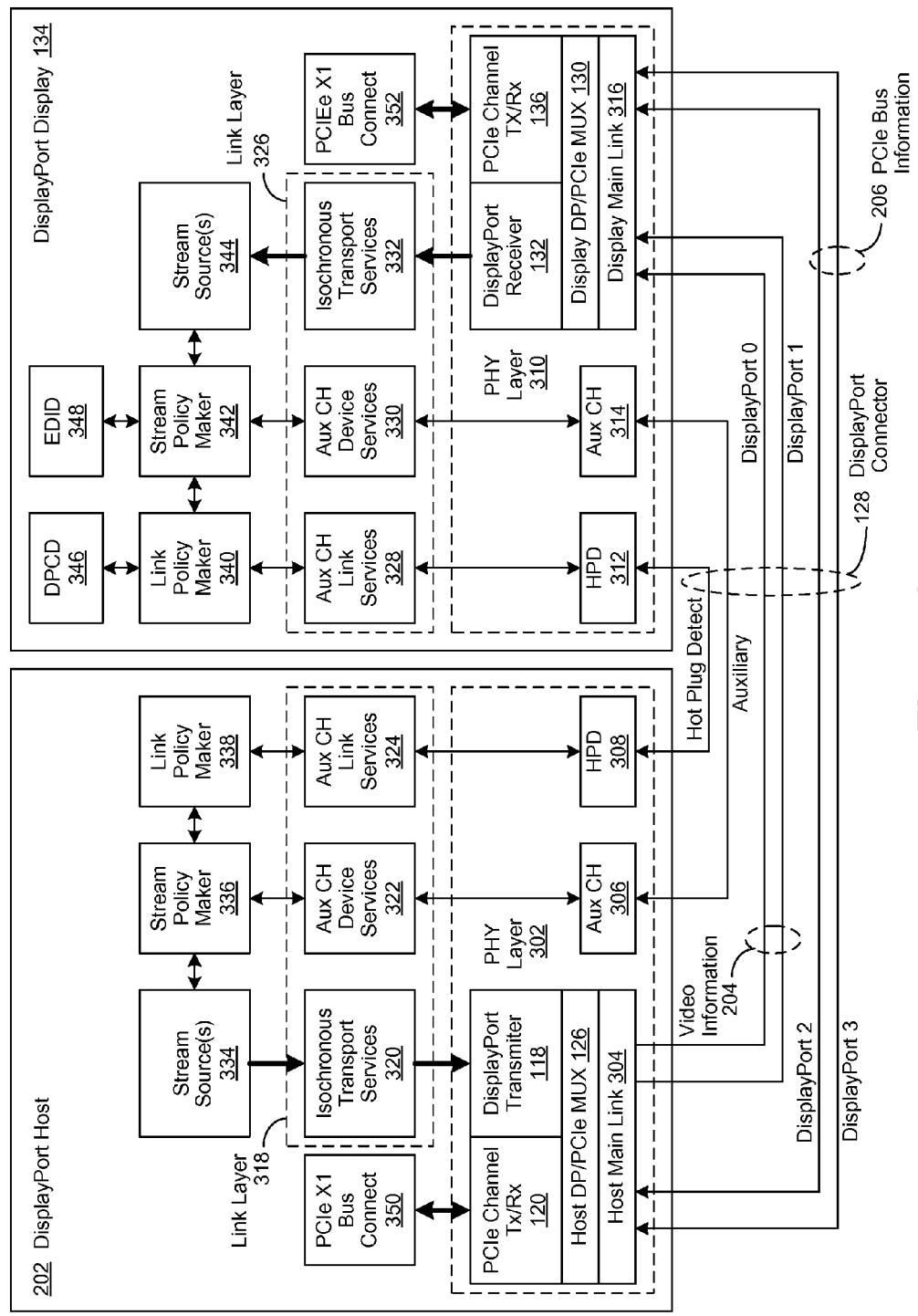
FIG. 3 is a generalized block diagram of a DisplayPort host as implemented in accordance with an embodiment of the invention to extend a PCIe X1 bus to a DisplayPort display.

FIG. 3 is a generalized block diagram of a DisplayPort host 202 as implemented in accordance with an embodiment of the invention to extend a PCIe X1 bus to a DisplayPort display 134. In selected embodiments, DisplayPort host 202 comprises physical layer 302, link layer 318, stream sources 334, stream policy maker 336, link policy maker 338, and PCIe Xi bus connection 350. DisplayPort display 134 similarly comprises physical layer 310, link layer 326, stream sources 344, stream policy maker 342, link policy maker 340, DisplayPort configuration data (DPCD) 346, extended display identification data (EPID) 348, and PCIe X1 bus connection 352.

PHY layer 302 comprises auxiliary channel 306, HPD channel 308, host main link interface 304, host DisplayPort/PCIe multiplexer 126, DisplayPort transmitter 118, and PCIe bus transmitter/receiver (Tx/Rx) 120. Link layer 318 comprises isochronous transport services 320, AUX channel device services 322 and AUX channel link services 324. The link layer 318 provides services as requested by the stream policy maker 336, which manages how to transport the DisplayPort video stream, and link policy maker 338, which manages the link and is responsible for keeping the link synchronized.

The PHY layer 310 comprising DisplayPort receiver 134 similarly comprises auxiliary channel 314, HPD channel 3312, display main link interface 316, display DisplayPort/PCIe multiplexer 130, DisplayPort receiver 132, and PCIe channel Tx/Rx 136. Link layer 318 comprising DisplayPort receiver 134 also similarly comprises isochronous transport services 332, AUX channel device services 330, and AUX channel link services 328. As in the DisplayHost 202, the link layer 318 provides services as requested by the stream policy maker 336, which manages how to transport the DisplayPort video stream, and link policy maker 338, which manages the link and is responsible for keeping the link synchronized.

As described in greater detail herein, PCIe X1 bus connection 350 provides PCIe bus information to PCIe channel Tx/Rx 120. The host DisplayPort/PCIe multiplexer 126 multiplexes the PCIe bus information received from PCIe channel Tx/Rx 120 with video signal information from DisplayPort transmitter 118 for conveyance over host main link interface 304. DisplayPort video signal information is then conveyed over lanes '0' and '1' 204 comprising DisplayPort connector 128. PCIe X1 is similarly conveyed over DisplayPort PCIe bus information lanes '0' and '1' 206, which likewise comprise DisplayPort connector 128. Multiplexed DisplayPort video signal information and PCIe bus information are received by display main link interface 316, which conveys it to display DisplayPort/PCIe multiplexer 130 where it is demultiplexed. Demultiplexed DisplayPort video signal information conveyed over DisplayPort video signal information lanes '0' and '1' 204 is routed by the DisplayPort/PCIe multiplexer 130 to the DisplayPort receiver 132. Demultiplexed PCIe bus information similarly conveyed over DisplayPort PCIe bus information lanes '2' and '3' 206 and received by display main link interface 316 is routed by the DisplayPort/PCIe multiplexer 130 to the PCIe Tx/Rx 136. The PCIe Tx/Rx 136 then conveys the demultiplexed PCIe bus information to PCIe X1 bus connection 352 where it is used to support PCIe peripherals (not shown).

It will be apparent to those of skill in the art that the transmission of PCIe X1 bus information over lanes '2' and '3' 206 comprising DisplayPort 128 is possible as PHY layers 302 and 310 respectively comprising DisplayPort host 202 and display 134 are equivalent to the PHY layer of the PCIe bus. For example, two DisplayPort lanes provides approximately 180 Mhz of bandwidth at 24 bit color depth. The provided bandwidth is greater than the 165 Mhz of bandwidth currently provided by a single DVI link and is sufficient to support display resolution up to 1900×1200 at 60 Hz. Restricting video signal information to DisplayPort lanes '1' and '2' allows the use of lanes '3' and '4' lanes for transmission of PCIe X1 bus information. Furthermore, the same physical connector pins as currently defined will allow the conveyance of both video and PCIe X1 bus information over the DisplayPort interface. Once conveyed through the DisplayPort interface, the PCIe X1 bus information can be routed to the PCIe Tx/Rx 136. In one embodiment, compatibility issues are addressed by routing PCIe X1 bus information only to those displays with the display DisplayPort/PCIe multiplexer 130 installed. In one embodiment, discovery of the presence of the display DisplayPort/PCIe multiplexer 130 is accomplished by querying the EDID information comprising the DisplayPort display 134. If a non-PCIe capable monitor is detected, then only video signal information comprising DisplayPort lanes '0' and '1' will be conveyed by the DisplayPort transmitter 118.

Other technical information for implementing the PCIe X1 bus extension in accordance with the present invention can be found in "DisplayPort Standard, Version 1.0," published on May 1, 2006 by the Video Electronic Standards Association (hereinafter referred to as the VESA DisplayPort specification), which by this reference is incorporated herein for all purposes.

FIGS. 4*a-b* are simplified block diagrams illustrating alternative implementations of a PCIe X1 bus extension delivered through a DisplayPort connector 128 in accordance with the present invention. FIG. 4*a* is a simplified block diagram illustration of a DisplayPort host 202 coupled via DisplayPort connector 128 to DisplayPort digital display 134 as implemented in an embodiment of the invention. DisplayPort host 202 comprises DisplayPort transmitter 118, which communicates video display information to DisplayPort receiver 132 via DisplayPort connector 128. DisplayPort connector 128 comprises a unidirectional main link, a bi-directional auxiliary link, and a unidirectional hot plug detect link.

DisplayPort host 202 comprises DisplayPort transmitter 118, used to communicate DisplayPort video signal information, and PCIe bus transmitter/receiver (Tx/Rx) 120 used to communicate PCIe bus information. DisplayPort host 202 further comprises host DisplayPort/PCIe multiplexer 126, which multiplexes DisplayPort video signal information for transport over DisplayPort video signal information lanes '0' and '1' 204 comprising DisplayPort connector 128. DisplayPort/PCIe multiplexer 126 similarly multiplexes PCIe X1 bus information for transport over DisplayPort PCIe bus information lanes '0' and '1' 206, which likewise comprise DisplayPort connector 128.

Multiplexed DisplayPort video signal information and PCIe bus information are received by display DisplayPort/PCIe multiplexer 130 where it is demultiplexed. Demultiplexed DisplayPort video signal information conveyed over DisplayPort video signal information lanes '0' and '1' 204 is routed by the DisplayPort/PCIe multiplexer 130 to the DisplayPort receiver 132. The DisplayPort receiver 132 then uses the demultiplexed DisplayPort video signal information to generate a visible image on DisplayPort digital display 134. Demultiplexed PCIe bus information similarly conveyed over DisplayPort PCIe bus information lanes '2' and '3' 206 is routed by the DisplayPort/PCIe multiplexer 130 to the PCIe Tx/Rx 136. The PCIe Tx/Rx 136 then uses the demultiplexed PCIe bus information to support PCIe X1 peripherals 138, which are physically connected to DisplayPort display 134.

FIG. 4*b* is a simplified block diagram illustration of a DisplayPort host 202 coupled via DisplayPort connector 128 to DisplayPort digital display 134 as implemented in an alternative embodiment of the invention. DisplayPort host 202 comprises DisplayPort transmitter 118, which communicates video display information to DisplayPort receiver 132 via DisplayPort connector 128. DisplayPort connector 128 comprises a unidirectional main link, a bi-directional auxiliary link, and a unidirectional hot plug detect link.

DisplayPort host 202 comprises DisplayPort transmitter 118, used to communicate DisplayPort video signal information, and PCIe bus transmitter/receiver (Tx/Rx) 120 used to communicate PCIe bus information. DisplayPort host 202 further comprises host DisplayPort/PCIe multiplexer 126, which multiplexes DisplayPort video signal information for transport over DisplayPort video signal information lanes '0' and '1' 204 comprising DisplayPort connector 128. DisplayPort/PCIe multiplexer 126 similarly multiplexes PCIe X1 bus information for transport over DisplayPort PCIe bus information lanes '0' and '1' 206, which likewise comprise DisplayPort connector 128.

Multiplexed DisplayPort video signal information and PCIe bus information are received by DisplayPort/PCIe X1 adapter 402, comprising adapter display DisplayPort/PCIe multiplexer 430 where it is demultiplexed. Demultiplexed DisplayPort video signal information conveyed over DisplayPort video signal information lanes '0' and '1' 204 is routed by the adapter DisplayPort/PCIe multiplexer 430 to the DisplayPort receiver 132. The DisplayPort receiver 132 then uses the demultiplexed DisplayPort video signal information to generate a visible image on DisplayPort digital display 134. Demultiplexed PCIe bus information similarly conveyed over DisplayPort PCIe bus information lanes '2' and '3' 206 is routed by the adapter DisplayPort/PCIe multiplexer 430 to the PCIe Tx/Rx 436. The PCIe Tx/Rx 436 then uses the demultiplexed PCIe bus information to support PCIe X1 peripherals 138, which are physically connected to DisplayPort/PCIe X1 adapter 402.

In this embodiment, compatibility issues are addressed for displays that do not have a display DisplayPort/PCIe multiplexer 130 installed. PCIe X1 bus information transmitted by host DisplayPort/PCIe multiplexer 126 is intercepted by adapter DisplayPort/PCIe multiplexer 430, where it is demultiplexed and routed to PCIe Tx/Rx 436 before it reaches DisplayPort display 134. In one embodiment, discovery of the presence of the adapter DisplayPort/PCIe multiplexer 430 is accomplished by querying the EDID information comprising the DisplayPort/PCIe multiplexer 430 and DisplayPort display 134. If a non-PCIe capable monitor is detected, then only video signal information comprising DisplayPort lanes '0' and '1' will be conveyed by the DisplayPort transmitter 118, but PCIe X1 bus information comprising lanes '2' and '3' will be routed to PCIe Tx/Rx 436. The PCIe Tx/Rx 436 then uses the demultiplexed PCIe bus information to support PCIe X1 peripherals 138, which are physically connected to DisplayPort/PCIe X1 adapter 402.

Although the present invention has been described in detail, it should be understood that various changes, substitutions and alterations can be made hereto without departing from the spirit and scope of the invention as defined by the appended claims.

What is claimed is:

1. An information handling system comprising:
   a processor configured to generate information;
   a video display subsystem interfaced with the processor and configured to process the information into video information for communication to a display;
   a host main link interfaced with video display subsystem and configured to connect to a display cable;
   a display configured to present the video information as visual images;
   a display main link interfaced with the display and configured to connect to a DisplayPort cable having first and second ends, the DisplayPort cable directly connected at the first end to the host main link and directly connected at the second end to the display main link, the DisplayPort cable configured to communicate the video information from the video display subsystem to the display across four serial links; and
   a peripheral directly coupled to the display and having associated peripheral information;
   wherein the display main link is further configured to communicate the peripheral information through the DisplayPort cable to the host main link, the display main link and host main link cooperating to selectively assign some of the four serial links to communicate the peripheral information while the remaining of the four serial links communicate the video information; and
   wherein the video information comprises DisplayPort information and the peripheral information comprises PCIe information.

2. The information handling system of claim 1 further comprising:
   a display receiver interfaced with the display main link and configured to receive the video information from the DisplayPort cable;
   a peripheral transceiver interfaced with the display main link and configured to communicate peripheral information with the DisplayPort cable; and
   a multiplexor disposed between the main link and the display receiver and the peripheral transceiver, the multiplexor configured to manage the interface of the video information and peripheral information through the DisplayPort cable.

3. The information handling system of claim 2 wherein the multiplexor manages the interface of video information and peripheral through a connector by interfacing the display receiver with predetermined of the links and the peripheral transceiver with predetermined of the links.

4. The information handling system of claim 1 further comprising:
   an identifier stored on the display; and
   logic associated with the video display subsystem, the logic operable to retrieve the identifier and apply the identifier to determine if a display connector includes peripheral information.

5. A method for communicating information comprising:
   connecting a DisplayPort cable directly to an information handling system at a first end and directly to a display at a second end;
   communicating video information from the information handling system to the display through plural serial links of the DisplayPort cable; and
   selectively communicating peripheral information from a peripheral device to the display and then from the display to the information handling system through some but not all of the serial links while the remaining of the serial links continue to communicate video information from the information handling system to the display;
   wherein the peripheral information is communicated from the display to the information handling system directly through the display without communication through other cables disposed between the display and information handling system; and
   wherein the video information comprises DisplayPort information and the peripheral information comprises PCIe information.

6. The method of claim 5 wherein the DisplayPort cable comprises four serial links and selectively communicating peripheral information further comprises communicating only video information through two of the four serial links and communicating only the peripheral information through the other two of the four serial links.

7. The method of claim 5 further comprising:
   retrieving identifier information from the display to the information handling system;
   analyzing the identifier information at the information handling system to confirm the availability of peripheral information communication at the display before the selectively communicating the peripheral information.

8. The method of claim 7 wherein the DisplayPort cable comprises a bi-directional auxiliary link and retrieving identifier information comprises retrieving the identifier information through the auxiliary link.

9. A method for communicating information between an information handling system and a display, the method comprising:
   generating video information at the information handling system;
   generating peripheral information at the display with a peripheral device directly coupled to the display;
   connecting a DisplayPort cable directly to the information handling system at a first end and directly to the display at a second end, the DisplayPort cable having plural serial links configured to communicate the video information from the information handling system to the display, the DisplayPort cable traveling directly between the information handling system and display without any intervening cables;
   communicating identifier information from the display to the information handling system, the identifier information indicating that the display can multiplex peripheral information with the video information through the DisplayPort cable; and in response to the identifier information, multiplexing the peripheral information through at least some of the DisplayPort cable serial links to communicate the peripheral information from the display to the information handling system;

wherein the video information comprises DisplayPort information and the peripheral information comprises PCIe information.

10. The method of claim 9 wherein multiplexing comprises communicating video information over less than all serial links of the DisplayPort cable and sending peripheral information over the remaining serial links of the DisplayPort cable.

11. The method of claim 10 wherein the DisplayPort cable has four serial links, communicating video information over less than all serial links comprises communicating video information over two of the four serial links, and sending peripheral information over the remaining serial links comprises sending peripheral information over the other two of the four serial links.

12. The method of claim 9 wherein communicating identifier information further comprises communicating identifier information across a bi-directional auxiliary link of the DisplayPort cable.

* * * * *